3,687,782
MACHINE FOR THE CONTINUOUS PRODUCTION
OF HELICAL CIRCULAR WAVE GUIDES
Georges N. Comte, Saint-Leu-la-Foret, France, assignor to Cables de Lyon Alsacienne, Lyon, France
Filed Nov. 18, 1969, Ser. No. 877,725
Claims priority, application France, Nov. 25, 1968, 175,263
Int. Cl. B31c 3/00
U.S. Cl. 156—425                    3 Claims

ABSTRACT OF THE DISCLOSURE

A circular, helicoidal wave guide of given length is continuously formed by making a support of several endless ribbons arranged longitudinally around a fixed chuck to slide virtually along the whole length of the chuck, and applying on the sliding support the various components of the guide, and driving the guide along longitudinally as it is formed, to extract it from the chuck.

BACKGROUND OF THE INVENTION

(1) Field of the invention

This invention relates to the continuous production of helical circular wave guides of considerable length.

(2) Description of the prior art

It is known to form helical wave guides by winding an insulated wire helically with contiguous turns onto a cylindrical mandrel, then covering this helix with one or more layers of insulating or conductive material impregnated with a thermosetting material.

It is of course desirable to produce such wave guides continuously to considerable lengths without being limited by the length of the mandrel.

It has already been proposed to use a machine for the production of a helical tube, wherein a wire, instead of being wound directly on a hollow mandrel is wound on an assembly of endless supporting tapes arranged longitudinally on the mandrel and which travel along the mandrel, their return path being within the mandrel. These tapes thus carry the section of tube along with them as the said tube is wound.

SUMMARY OF THE INVENTION

This invention provides a machine of this kind which is specially adapted to the production of wave guides and which, contrary to the known art, is characterized in that the tapes travelling along the mandrel are tapes of dielectric material and that they are not endless tapes returned through the interior of the mandrel but are left on the internal surface of the coil constituting the wave guide.

The result of this is not only to simplify the machine but also to improve the electrical qualities of the guide by reason of the selective properties of this internal lining relatively to parasitic transmission methods.

The selective properties being known in the prior art, for example, in the Karbowiak U.S. Pat. No. 3,066,268 granted Nov. 27, 1962.

This invention also provides a wave guide which is constructed by means of this machine and which is characterized in that it comprises a certain number of insulating tapes arranged longitudinally within the tube constituted by the helically wound insulated wire.

DESCRIPTION OF THE PREFERRED EMBODIMENT

Figure 1:
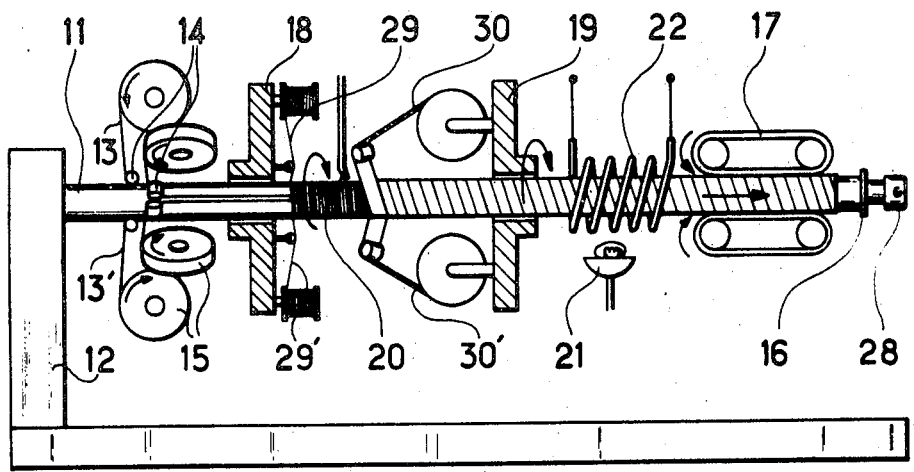
FIG. 1 is a diagrammatic view in elevation of a machine employing the method of the present invention.
Figure 2:
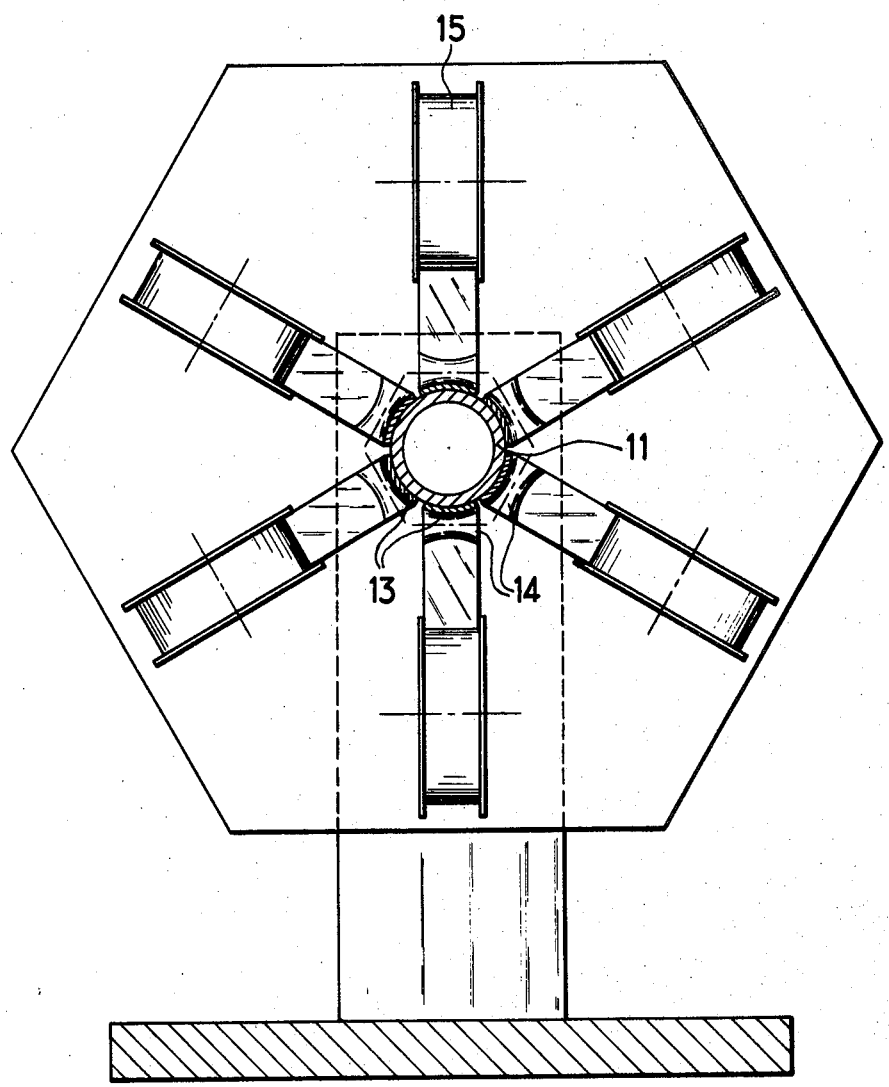
FIG. 2 is a end view of a portion of the machine of FIG. 1.

A fixed mandrel 11 is held at one of its ends by a support 12 fixed to the frame of the machine.

On the surface of this mandrel, several thin insulating tapes such as 13, 13' are applied by pulleys such as 14, the tension of these tapes being kept uniform by pulley carriers provided with unwinding-regulating systems such as 15. The end on each of these tapes is fixed at the beginning to a ring 16 coaxial with the mandrel 11 and is drawn along the mandrel by a drawing device such as a friction belt system 17 which communicates a longitudinal translational movement thereto.

One or more reels of conductor wire 29, 29' are given a rotational movement about the mandrel by means of a rotating plate 18 driven by a motor, so that the wires are wound on the mandrel, or, more precisely, on the tapes 13 which slide along said mandrel. They form a helix which progresses as the tapes advance along the mandrel.

After the wires 29 have been placed on the longitudinal supporting tapes 13, wheel supports such as 19, rotating about the mandrel, apply to the helix one or more successive layers of insulating or conductive banding tapes 30, 30', or alternatively, strips of steel or other metal.

Through nozzles such as 20 there is discharged, under pressure or by gravity, a thermosetting material which is applied to the layer or between the successive layers of tapes 30 during the course of the formation or advance of the layers.

This material is then hardened by heating, either by infra-red radiation projectors or lamps such as 21 or by an induction solenoid 22 through which a high-frequency electric current passes.

Of course, the mandrel 11 should be made sufficiently long for the material cementing together the various component layers of the guide to be fully hardened when the section thus produced leaves the mandrel under the effect of the sliding action produced by the longitudinal supporting tapes 13.

As soon as a first section has been formed in this way, the friction belt system 17 acts on its outer surface to communicate a translational movement to the guide assembly forming, since the ring 16 has then left the field of action of this friction belt system.

The insulating supporting tapes 13 travel continuously with the guide, within which they are left.

The motors operating the rotating wheel supports such as 19 and the friction belt system 17 have not been described, nor have the various synchronizing devices ensuring the correct placing of the component parts and the advancing of the guide as it is formed, since these devices belong to the known art.

It is possible to check continuously the internal diameter of the guide as it is being formed by means of a measuring plug such as 28 (FIG. 1) which is arranged at the downstream end of the mandrel, this plug possibly being of the pneumatic or capacitive gauge type, or of any other known type.

What is claimed is:

1. A machine for the continuous production of wave guides having considerable length comprising:
   a solid supporting mandrel form;
   means for longitudinally distributing more than one dielectric tape on the mandrel, each tape being aligned in a parallel longitudinal direction;
   means for winding conductive wire about the dielectric tape to form a conductive helix;
   means for spreading thermosetting material on the wire;
   means for winding banding tape about the wire conductive helix;
   means for binding the wire, dielectric tape, banding tape, and thermosetting material into a single unitary structure;
   means for continually advancing the unitary structure along and off of the mandrel whereby a wave guide of any length can be formed, and
   means for providing an uninterrupted continual measurement of the internal diameter of the wave guide located at the end of the mandrel.

2. A machine as in claim 1, the mandrel length being sufficient to permit a hardening of the thermosetting to such a degree that it can be handled without deformation and means for increasing the curing of the thermosetting material.

3. A machine as in claim 2, where the advancing means is a pair of continually turning endless friction belts.

References Cited

UNITED STATES PATENTS

| | | | |
|---|---|---|---|
| 366,361 | 7/1887 | Westinghouse, Jr. | 174—107 |
| 469,663 | 2/1892 | Greenfield | 29—202.5 X |
| 2,611,101 | 9/1952 | Wallauschek | 333—31 A X |
| 2,706,366 | 4/1955 | Best | 333—31 A |
| 2,720,609 | 10/1955 | Brück et al. | 333—31 A X |
| 2,771,565 | 11/1956 | Bryant et al. | 333—81 C X |
| 2,817,739 | 12/1957 | Haagensen | 333—81 C X |
| 3,066,268 | 11/1962 | Karbowiak | 333—95 |
| 3,121,206 | 2/1964 | Mandel | 333—95 |
| 3,273,226 | 9/1966 | Brous et al. | 29—600 X |

OTHER REFERENCES

RCA, "Means for Supporting Magnetic Elements of Traveling Wave Tubes," RCA tech. notes, RCA TN #194, 1958.

BENJAMIN A. BORCHELT, Primary Examiner

H. J. TUDOR, Assistant Examiner

U.S. Cl. X.R.

156—55